March 1, 1932.  J. V. MARTIN  1,847,093
MOTOR COOLING DEVICE
Filed June 15, 1927  2 Sheets-Sheet 1
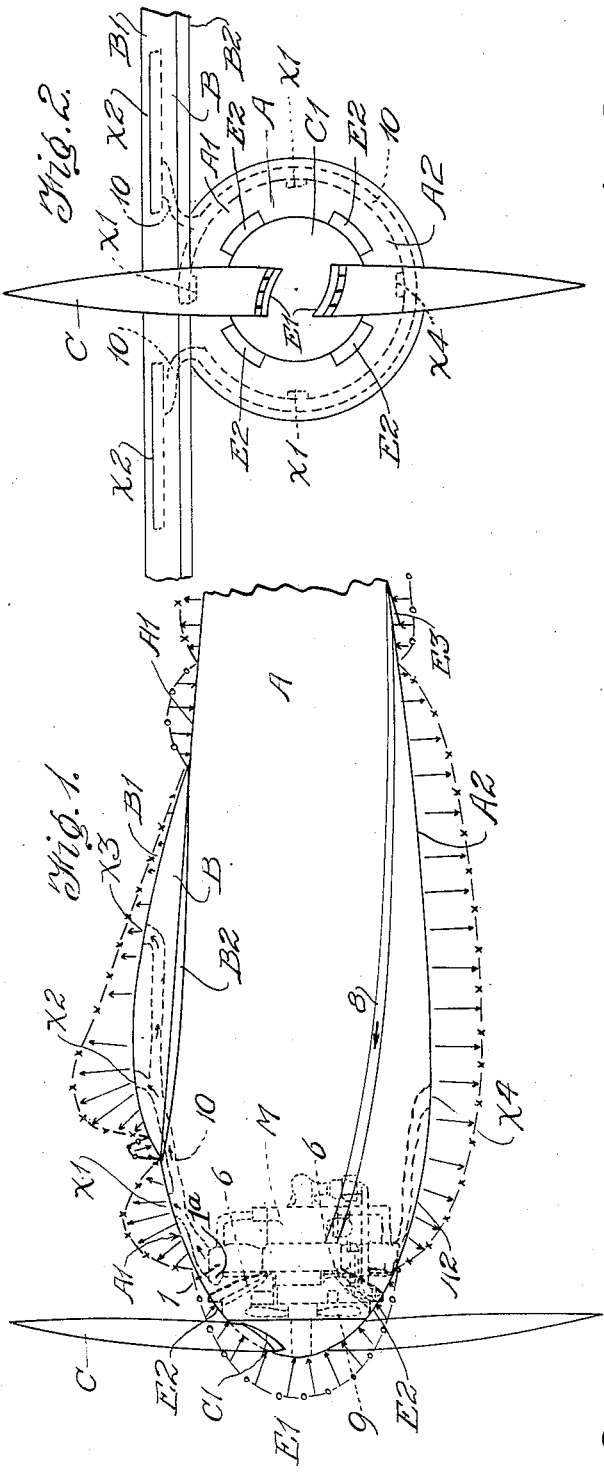
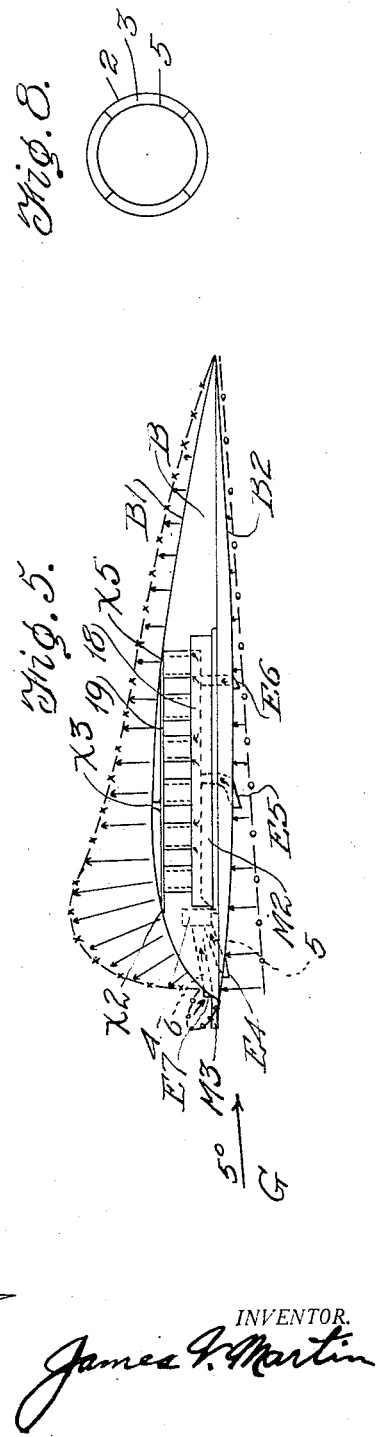
INVENTOR.
James V. Martin March 1, 1932.   J. V. MARTIN   1,847,093
MOTOR COOLING DEVICE
Filed June 15, 1927   2 Sheets-Sheet 2

INVENTOR.
James V. Martin

Patented Mar. 1, 1932

1,847,093

UNITED STATES PATENT OFFICE

JAMES V. MARTIN, OF GARDEN CITY, NEW YORK

MOTOR COOLING DEVICE

Application filed June 15, 1927. Serial No. 198,945.

The primary object of my invention is to reverse the usual affect of aeroplane motor cooling devices upon the flying qualities of the aeroplane. Up to the time of my present invention these have been detrimental in point of the wind resistance, interference, weight and complication, which they caused.

My present invention does away with the weight and complication of water radiator cooling and also eliminates the wind resistance and interference due to exposing air cooled cylinders.

A further object of my invention is to provide an alteration of pressure distribution in flight so that the aeroplane drag is lessened and so that the lift of the aeroplane is increased.

A further object of my invention is to provide an artificially increased air flow adjacent certain lifting surfaces.

Still further objects of my invention will become apparent from the following description in which like letters and numerals refer to like parts as disclosed in the several views of the accompanying drawings.

Fig. 1 is a side elevation of a typical aeroplane fuselage or body, but omitting the rear end thereof, and indicating the relation of my invention to the air pressure distribution in flight.

Fig. 2 is a front elevation of the fuselage and wing seen in Fig. 1.

Fig. 5 is a view in side elevation of my invention as applied to a motor housed within a wing.

Figure 7:
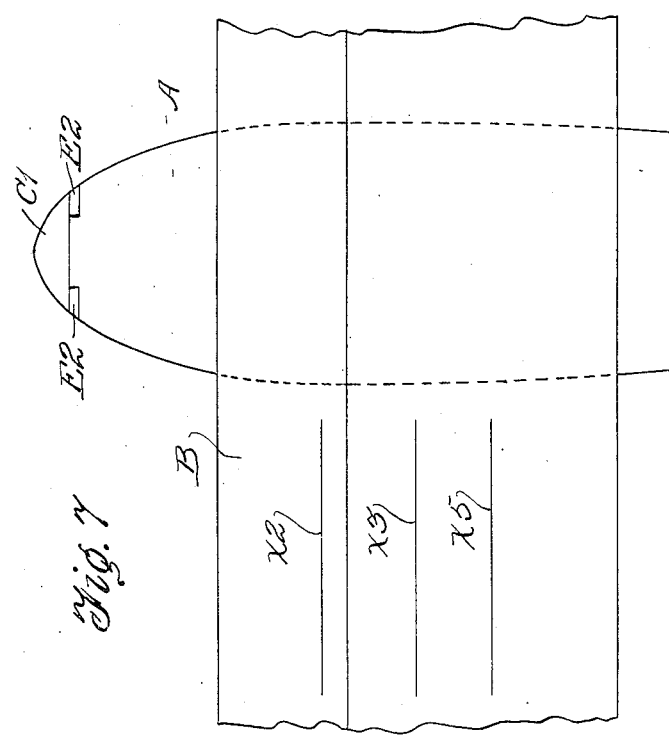
Figure 6:
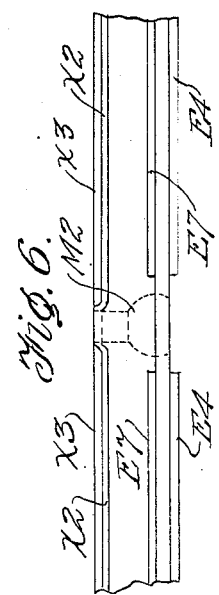
Fig. 6 is a front elevation following the subject matter of Fig. 5.

Fig. 7 is a plan view of the fuselage and wing shown in Figs. 1 and 2 and Fig. 8 is an enlarged sectional view of one of the motor cylinders, shown in both the radial form of Figs. 1 and 2 and the vertical type shown in Figs. 5 and 6.

Referring now to the details of the several figures, A represents the body or fuselage of a typical aeroplane and B a wing attached to the upper part thereof; a propeller C protrudes from a spinner C1, which is mounted on the crankshaft of a radial type motor M, the spinner C1 constituting the forward part of the fuselage streamline.

When a form such as disclosed by Figs. 1 and 2 is driven at speed through the air, experiments in wind tunnels reveal varying air pressure distribution along the external skin of the fuselage and wing, for example (See Fig. 8 of N. A. C. A. Technical Memorandum No. 300), just to rearward of the spinner C1, along the upper and lower surfaces A1 and A2 as well as along the sides thereof when these sides have a form such as that shown in Fig. 7, there is a positive or plus air pressure indicated in Fig. 1, of my drawings by —o—o—o— and by arrows showing the direction and, by the length of the arrows, the general comparative amount of the pressure impinging against the fuselage surface.

Over other areas of the surface A1, as between the positive area just mentioned and the leading edge of the wing B, will be found a negative area indicated by —x—x—x—x with arrows indicating direction and amount of minus or suction pressure. Over the wing area and over other parts of the fuselage these areas of positive and negative pressure have been indicated, particularly in Figs. 1 and 5. There are many scientific reports dealing with these pressure distribution areas for example see U. S. Navy Wind Tunnel Report No. 34 of July 7, 1918, and National Advisory Committee for Aeronautics reports Nos. 229 and 254.

The curves and arrows of Figs. 1 and 5 are not accurate in location and form, as they would be if they were the result of a special wing tunnel pressure distribution series of tests made upon the exact shapes disclosed in my drawings, but they represent typical instances of the kind of air pressure distribution with which my invention deals: It will be understood that changes in form, angle to air path and velocity affect the location and character of the air pressure distribution over the aeroplane external skin and my invention will also cause specific change.

However, by actual flight experiments, it will be possible to determine with close accuracy exactly the best locations upon the aeroplane, of any given shape, for the location of my invention and I propose herein to give such a full and accurate disclosure of the invention in relation to typical air flow that anyone versed in the art of aerodynamics and having the facilities for determining air distribution will be able to apply the invention readily.

Having regard to Fig. 1 it will be seen that the air cooled motor illustrated is shown completely inclosed instead of having a large portion of the cylinders protruding beyond the external skin A1, A2 as is current practice. In place of the protruding cylinders with air cooling fins I substitute a cylinder jacket 2, of Fig. 8 around the cylinder wall 5, which provides a space 3 through which air will circulate to cool the cylinder wall 5. Such an air jacket is old in the automobile art and my invention relates to novel means of obtaining cooling airflow through such jackets and in novel use of the airflow before and after it passes through the said jackets.

I also show a fan 9 immediately to rearward of the spinner C1 which is to be used to cool the motor when the aeroplane is not in flight and for use, in flight when the plane is at certain angles and to increase the lift and lower the drag of the plane in flight.

Figure 4:
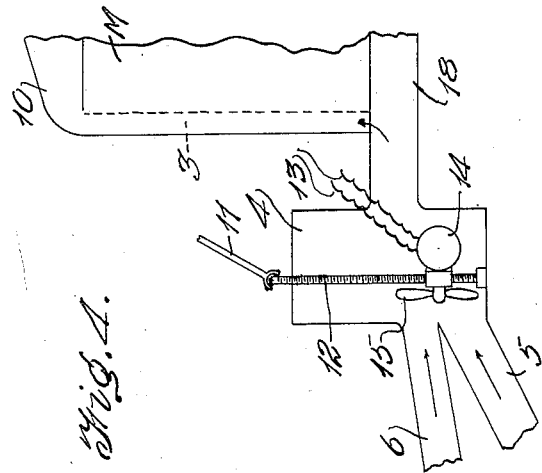
Fig. 4 is an enlarged view of part 4 of Fig. 5.
Figure 3:
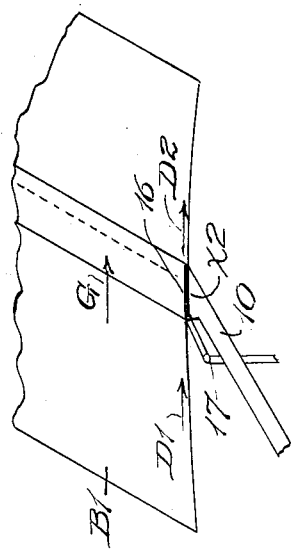
Fig. 3 is an enlarged sketch of the air exit devices, indicated in Figs. 1 and 2, by 1, X2, X3 and X4.

Under the supposition that the spinner itself, in flight, is a positive —o—o—o— pressure area I have provided adjacent the propeller blade and in the propeller blade itself openings E1, E2 to receive cool air which passes through the fan blades to an air jacket at the place of attachment of the cylinders to the motor M, crank case, and thence, aided by the suction areas —x—x—x— to certain constricted exits X1, X2, X3 and X4, disclosed in detail in Fig. 3.

Other openings E2 are shown at other positive pressure areas —o—o—o—, with pipe leads 6 for the air to the bottoms of the cylinder jackets 2, and another such opening E3 is provided with a pipe line 8 leading cool air to the crankcase of the cylinders 1 so that it may pass through the jackets 2 and escape at the exits X1, X2, X3, and X4.

It will be obvious to the student of aerodynamics that the positive —o—o—o— pressures in certain areas like those in front of the spinner, in the front portion of the fuselage and on top of the wing impede the aeroplane's flight efficiency, while these same sort of positive —o—o— pressure areas located on the bottom surface of the wing or on the rear of bottom of the fuselage aid the flight efficiency; likewise the negative areas —x—x—x—x— when in the forward or upward portions of the aeroplane aid the plane's flight and when located on the rearward or downward parts retard the plane's flight.

My invention would reduce the positive areas where detrimental and increase the negative areas where beneficial or where possible transpose a positive and a negative area. While the aerodynamic science is in its infancy, there is ground to believe that the so-called positive areas —o—o— are associated with air in comparatively slow motion and the negative areas —x—x—x— with air in high motion, furthermore the strata or film of air immediately adjacent the aeroplane external skin is probably the most important portion of the air in determining the amount and extent of positive or negative pressure areas. For this reason I have invented relatively large openings to receive the slow air and comparatively small narrow exits to emit the air at higher velocities and also to force the air so emitted to pursue a path closely along the surface and in the direction of the airflow producing negative or —x—x—x— suction areas.

The pipe or lead 10, Fig. 1, carrying the hot air from the cylinder 1, leads by branches to transversely arranged slot exits X2, X3 of the wings, and by means of control levers 17 of Fig. 3, the pilot or mechanic who presumably can move about in the inclosed portions of A. (The pilot's cockpit has been omitted, since that may be located in a number of different places without affecting the invention), can open or close these exits X2, X3 or X5 at will and the cover plate for the slot is so fashioned, see 16 of Fig. 3, that the air on leaving the slot will have a direction D2 as closely as possible parallel to the surface B1 and about the same as D1, or the airflow normal to the upper part of the wing surface. Inspection of cover plate 16, Fig. 3, shows a slightly concave under side. The cylinder exhaust 1a can also be directed through the lead or conduit 10.

So it will be observed that not only the location of the air ports, and their larger size as compared to the exits is important, but also the form of the exits and the deflector type closure therefor. In this respect my present invention is an improvement on my copending application division of Serial No. 605,411, filed Dec. 7, 1922.

Slots leading from the lower wing surface to the upper have been known and used in the art, but never to my knowledge has the exit flow of the air been carefully directed along the surface in a rearward direction and at a velocity greater than that normal otherwise for that area.

Fig. 5 for example shows the advantage of having several exit slots X2, X3 and X5 successively arranged along the aerofoil, so that as the angle of attack, indicated at G as 5 degrees for the pressure curves shown, is changed and as the pressure distribution areas change, the pilot can at will, use whichever slot will produce the most airflow. It is also well known that the burble point of the air flow can be prolonged to larger angles by allowing some of the positive pressure of the under wing surface to pass to the upper, but the present invention seeks to improve this condition by regulating the direction and increasing the velocity of the air emitted.

Fig. 5 shows a vertical cylinder motor M2, located inside the wing surfaces, and having airjacket cooling space about the cylinders such as shown in Fig. 8. A propeller shaft M3 is indicated protruding from the leading edge of the wing B, and positive air pressure areas are indicated at —o—o—o— with openings E7, E4 which let air into pipes or passages 6 and 5 respectively and these lead to a chamber 4, wherein is arranged a blower fan 15, driven by a motor 14, supplied with power by wires 13 and supported upon a worm shaft 12, which is operable by the pilot by control shaft 11 for the purpose of removing the fan from impeding the airflow, when the fan is not needed. The wing form employed may be that of the main aeroplane wing or the motor, having any desirable arrangement and disposition of cylinders, or the motor may be inclosed in a special aerofoil shape.

Appropriate arrows indicate the direction of the air flow as it passes through the scoop like openings and leads to the airtight compartment 18 and thence through the cylinder jackets 2 to the exit feed pipe 19 and thence to the exit slots X2, X3 and X5. It should be noted that controls of a like nature to those shown in Fig. 3 permit the pilot to open or close the entrance air scoops at will and selectively. Obviously the invention may be applied to automobiles.

Having thus described my invention and the nature of its operation it will be observed that the principle may be widely varied without departing from the spirit of my disclosure and I do not limit the patent to the particular form of arrangement shown. What I claim as new and desire to protect by Letters Patent is:—

1. In combination with the airflow along the upper surface of an aeroplane wing, means for producing and emitting air from apertures in the said surface at a higher rate of velocity than the normal rate of flow due to flight of the plane at given angles of incidence and means for selectively opening and closing said apertures, the last said means having a form to deflect the emitted air flow.

2. In combination with the air flow over the curved upper surface of an aeroplane wing means for emitting air from multiple slot-like apertures in the said upper surface and means selectively operable by the pilot in flight to direct the said emitted air tangentially to the wing curve at the slot location.

3. In combination with a shape adapted to be driven at speed through the atmosphere, a motor provided with air jackets inclosed within the said shape, a conduit or lead for air from an opening in the external surface of the said shape to the said jackets, a power driven fan arranged to cause circulation of air from the said opening through the said jackets and means within the control of an operator to alter the position of the said fan so that it does not interfere with air flow through the said jackets while the said shape is in motion through the atmosphere.

4. In combination with the pressure distribution about an aeroplane fuselage in motion through the atmosphere, a continuous air circulation system including in order as follows:—an air inlet in the skin of the said fuselage, a pipe line to an air chamber, a power driven fan within the said chamber, an air jacket of a motor and a pipe line from said jacket to openings in the external skin of the said fuselage for emitting airflow actuated by the said fan in cooperation with air pressure distribution about the said fuselage.

5. In combination with the air flow about an aeroplane wing, an opening in the said wing's surface, a motor cylinder housed within the said wing, means to direct air from the said opening to the said cylinder to cool the same, means to carry the heated air from the said cylinder to exits on the upper surface of the said wing and said last mentioned means providing an escape for the said cylinder exhaust so that the same cooperates with the external airflow about the wing to increase the circulation of the air through the said jacket.

6. In combination with an aircooled motor housed within an aerofoil in flight three separate means all cooperating to circulate air through that part of the aerofoil adjacent the said motor, i. e. air inlets and exits located in appropriate air pressure areas of the wing surface, a mechanically driven fan located adjacent the said motor and the motor exhaust leading into the said air exits.

7. In combination with an aeroplane motor located within a sustaining aerofoil traveling at speed through the atmosphere, means for allowing the heated air from about the motor cylinders to escape to areas of low pressure in the external surface region of the said wing and the cylinder exhaust of the said motor directed into the said means.

8. In combination with cooling means for aeroplanes in flight an aerofoil of continuously double convex upper and lower ordinates from leading to trailing edge, motor cylinders located within the said aerofoil in the region of the greatest ordinates, air openings in the lower surface of the said wing, air exit openings in the upper surface of the said wing and means to carry the motor exhaust to the said exit openings.

9. In combination with the pressure distribution generated about a streamline body, moving at speed through the atmosphere, means for the passage of air from a positive to a negative area, said means including openings in the external skin of the said body, piping means from the said openings to an air reservoir and thence to an air jacket attached to the aeroplane motor and piping means from said jacket to an exit opening in the skin of the said body, the said reservoir and piping means being inclosed within the said external skin.

10. In combination with an internally disposed aeroplane motor and air pressure means of cooling the same, a pipe line from external portions of the fuselage surface to an air jacket surrounding the motor, another pipe line from the said jacket to slots located along the upper surface of the aeroplane wing and an air deflector closure for the said slot within the control of the pilot.

11. In combination with the use of air pressure differentials about the external surfaces of an aeroplane in flight to cool an aeroplane motor a means of conducting air through the interior of the said aeroplane and about the said motor without mixing the said air with the other inclosed aeroplane air and alternative means within the control of the pilot of allowing the air to escape so that he can alter the location of the air exit.

In testimony whereof I affix my signature.

JAMES V. MARTIN.